United States Patent
Slottner (10) Patent No.: US 12,461,014 B2
(45) Date of Patent: Nov. 4, 2025

(54) COMPONENT WEAR STATE EVALUATION METHOD AND TOOL

(71) Applicant: Siemens Energy Global GmbH & Co. KG, Bayern (DE)

(72) Inventor: Pontus Slottner, Norrkoping (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 240 days.

(21) Appl. No.: 17/780,619

(22) PCT Filed: Nov. 20, 2020

(86) PCT No.: PCT/EP2020/082899
§ 371 (c)(1),
(2) Date: May 27, 2022

(87) PCT Pub. No.: WO2021/110441
PCT Pub. Date: Jun. 10, 2021

(65) Prior Publication Data
US 2023/0358666 A1    Nov. 9, 2023

(30) Foreign Application Priority Data
Dec. 4, 2019   (EP) .................................. 19213632

(51) Int. Cl.
*G01N 17/00*    (2006.01)
*F01D 21/00*    (2006.01)
*G01M 15/14*    (2006.01)

(52) U.S. Cl.
CPC ......... *G01N 17/006* (2013.01); *F01D 21/003* (2013.01); *G01M 15/14* (2013.01); *F05D 2260/80* (2013.01)

(58) Field of Classification Search
CPC ...... G01N 27/90; G01N 17/00; G01N 17/006; G01N 3/56; G01N 27/026; G01N 17/02;
(Continued)

(56) References Cited

U.S. PATENT DOCUMENTS

| | | | |
|---|---|---|---|
| 4,985,622 A | | 1/1991 | Kessler |
| 2003/0008065 A1* | | 1/2003 | Trantow .............. C23C 28/3215 427/9 |

(Continued)

FOREIGN PATENT DOCUMENTS

| | | | |
|---|---|---|---|
| CA | 2825678 A1 * | 8/2012 | ......... G01N 21/8422 |
| CN | 102169531 A | 8/2011 | |

(Continued)

OTHER PUBLICATIONS

Lidong Teng, Oxidation Behavior of TiAl—8Nb Turbine Blade Alloy, 2007 (Year: 2007).*

(Continued)

*Primary Examiner* — Kristina M Deherrera
*Assistant Examiner* — Truong D Phan
(74) *Attorney, Agent, or Firm* — Wolter Van Dyke Davis, PLLC (57) ABSTRACT

A method, system and tool for determining the wear state of a component of a continuous flow engine. The method includes determining multiple types of oxidation layers and their properties, wherein the oxidation layers originate from the same material of the component, and diagnosing the wear state of the component by utilizing the properties of the oxidation layers.

20 Claims, 2 Drawing Sheets

(58) Field of Classification Search
CPC .............. G01N 33/2805; G01N 33/32; G01N 2203/024; G01M 5/0033; G01M 99/007; G01M 15/14; F01D 21/003; F05D 2260/80
USPC .......................................................... 73/86
See application file for complete search history.

(56) References Cited

U.S. PATENT DOCUMENTS

| | | |
|---|---|---|
| 2003/0037606 A1 | 2/2003 | Bernhardi et al. |
| 2005/0159912 A1* | 7/2005 | Ruzzo .................... G01N 27/90 702/108 |
| 2006/0025936 A1* | 2/2006 | Plotts .................... G01N 17/006 702/34 |
| 2011/0073217 A1* | 3/2011 | Smith ........................ C23C 8/42 148/426 |
| 2012/0283963 A1 | 11/2012 | Mitchell |
| 2013/0006541 A1* | 1/2013 | Kominsky ........... G05B 23/024 702/34 |
| 2018/0291856 A1* | 10/2018 | Chandrakar ........ F02D 41/1467 |
| 2018/0364037 A1* | 12/2018 | Singh ..................... G01B 15/02 |
| 2020/0096308 A1* | 3/2020 | Hughes .................... G01B 7/06 |

FOREIGN PATENT DOCUMENTS

| | | | |
|---|---|---|---|
| CN | 103649470 A | | 3/2014 |
| EP | 1426759 A1 | | 6/2004 |
| JP | S58137755 A | | 8/1983 |
| JP | S60177260 A | | 9/1985 |
| JP | S61237053 A | * | 10/1986 |
| JP | H11148931 A | | 6/1999 |
| JP | 2001166819 A | | 6/2001 |
| JP | 2004132768 A | | 4/2004 |
| JP | 2008014747 A | | 1/2008 |

OTHER PUBLICATIONS

Database Compendex:; "Teng Let al: Oxidation behavior of TiAl—8Nb turbine blade alloy, XP002802079, Database accession No. E20073110741450 & Teng L et al: Oxidation behavior of TiAl—8Nb turbine blade alloy, Metallurgical and Materials Transactions B: Process Metallurgy and Materials Processing Science Jun. 2007 Springer Boston US, vol. 38, No. 3, pp. 477-484, DOI: 10.1007/S11663-007-9061-2"; Engineering Information, Inc., New York, NY; 2007.

PCT International Search Report and Written Opinion of International Searching Authority mailed May 3, 2021 corresponding to PCT International Application No. PCT/EP2020/082899 filed Nov. 20, 2020.

Liu Chunyang, "Study on the effect of bonding layer surface state on the service life of thermal barrier coating", Master's Thesis, Text Database, Engineering Science and Technology 1 of China, 2009, pp. 26-31 (English machine translation attached].

Chinese search report from corresponding Chinese Patent Application No. 202080084503.5 with English machine translation submitted as indication of relevance for the foreign language Non-Patent Literature Cite No. 1, Liu Chunyang, "Study on the effect of bonding layer surface state on the service life of thermal barrier coating".

Lidong Teng et al: "Oxidation Behavior of TiAl-8Nb Turbine Blade Alloy", Metallurgical And Materials Transactions B, (2007), 477-494, vol. 38, No. 3, Springer-Verlag, New York, XP019697896.

* cited by examiner

FIG. 3

COMPONENT WEAR STATE EVALUATION METHOD AND TOOL

CROSS REFERENCE TO RELATED APPLICATIONS

This application is the US National Stage of International Application No. PCT/EP2020/082899 filed 20 Nov. 2020, and claims the benefit thereof. The International Application claims the benefit of European Application No. EP19213632 filed 4 Dec. 2019. All of the applications are incorporated by reference herein in their entirety.

FIELD OF INVENTION

The present invention refers to a method of determining the wear state of a component of a continuous flow engine. Furthermore, the present invention refers to a computer program product to execute such method. Additionally, the present invention refers to a system to execute a corresponding evaluation. Furthermore, the present invention refers to a maintenance tool for acquiring the data for such method. Additionally, the present invention refers to a use of such method or such maintenance tool during the maintenance of a continuous flow engine.

BACKGROUND OF INVENTION

This and further problems are solved by the products and methods as disclosed hereafter and in the claims. Further beneficial embodiments are disclosed in the dependent claims and the further description and figures. These benefits can be used to adapt the corresponding solution to specific needs or to solve additional problems.

SUMMARY OF INVENTION

According to one aspect the present invention refers to a method of determining the wear state of a part of a component of a continuous flow engine, wherein the method contains the steps of—determining multiple types of oxidation layers and their properties like the distance to the surface and their thickness, wherein the oxidation layers originate from the same material of the component,—diagnosing the wear state of the component by utilizing the properties of the oxidation layers.

Surprisingly, it was noted that a specific layer arrangement resulting from oxidation process especially under extreme conditions as provided in hot gas paths of continuous flow engines was observed. The oxidation layers are essentially parallel to the surface. The term "essentially parallel to the surface as used herein refers to an arrangement, wherein the oxidation layers are essentially parallel to the surface. For example, the distance of the middle line through such oxidation layer to the surface in a cross section perpendicular to the surface deviates less than 10%, more preferred less than 5%, even more preferred less than 3%, from the average distance of said middle line to the surface. For example, a component providing cavities contains at least one outer and at least one inner surface. However, unless it is specified otherwise the surface as used herein refers to the nearest surface of the component. This results in a stack of oxidation layers, wherein the single oxidation layers extend over at least a part of the surface and the extending from the surface to the interior Herein, it has to be noted that the oxidation state in itself is especially in such application cases typically not relevant with regard to the properties of the component. In such applications the component is replaced or refurbished long before the oxidation level reaches a degree so that the oxidation poses a reasonable threat to the usage of the component. However, it was surprisingly noted that the small amount of oxidation and its specific structure allows a very precise prediction of the wear state and even allows to deduct the prior usage of the component. To predict the prior usage of the component beneficially historic data of comparable components is utilized and/or a digital model of the component like a digital twin are utilized. Especially for application cases like the continuous flow engines it is very beneficial to provide such possibility to compare such reliable indicator to an expected and/or simulated state of the component. This allows to guarantee a safe operation and reliable performance of the component until the next maintenance. It also allows to significantly reduce the safety margins required to guarantee that a corresponding device provides the required reliability and performance as desired and guaranteed.

Typically, such continuous flow engines utilize a stream of fluid continuously flowing through the engine to rotate a rotor, wherein the kinetic energy is, for example, converted into electricity. For example, such fluid stream can be generated by means of burning a fuel using burners in a gas turbine or boiling a liquid like water in a steam generator. Examples of corresponding continuous flow engines are gas turbines and steam turbines. Furthermore, such continuous flow engines can, for example, be utilized as compressors to compress the fluid streaming through the continuous flow engine. Such compressor can also be combined with a continuous flow engine utilized for energy production to increase the mass flow through the turbine part. Continuous flow engines are very versatile and reliable devices being an important part of modern industry.

According to a further aspect the present invention refers to a computer program product, tangibly embodied in a machine-readable storage medium, including instructions operable to cause a computing entity to execute an inventive method.

According to a further aspect the present invention refers to a system comprising a processor and a non-transitory computer readable medium comprising computer executable instructions that when executed by the processor cause the system to perform operations comprising:—evaluating the data regarding the multiple oxidation layers, wherein the oxidation layers originate from the same material of the component,—diagnosing the wear state of the component by utilizing the properties of the oxidation layers.

According to a further aspect the present invention refers to a maintenance tool for measuring the oxidation layers for an inventive method, wherein the maintenance tool collects data with regard to the multiple oxidation layers, wherein the data contain the position and thickness of the multiple oxidation layers and/or can be utilized to determine the position and thickness of the multiple oxidation layers.

According to a further aspect the present invention refers to a use of an inventive method or an inventive maintenance tool during the maintenance of a continuous flow engine. Surprisingly, it was noted that utilizing the inventive maintenance tool provides highly beneficial information enabling to significantly improve the maintenance work of such engines. Especially, the possibility to acquire data to be used for evaluating the wear state of the continuous flow engine proved to be highly beneficial. Furthermore, it was surprisingly noted that the information acquired can be utilized in corresponding models to evaluate the future wear of the continuous flow engine and improve the service and maintenance planning of such engine with a significantly improved precision and reliability. Very surprisingly, it is even possible to measure components providing a protective coating without requiring to remove said coating.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

To simplify understanding of the present invention it is referred to the detailed description hereafter and the figures attached as well as their description. Herein, the figures are to be understood being not limiting the scope of the present invention, but disclosing preferred embodiments explaining the invention further.

Preferably, the embodiments hereafter contain, unless specified otherwise, at least one processor and/or data storage unit to implement the inventive method.

In the following the invention will be exemplarily refer to continuous flow engines like compressors or gas turbines. It was noted that the application of the invention in such area was especially beneficial. In more detail it was noted that, for example, the extreme requirements with regard to the overall quality of components utilized in this field provides a significant challenge. Simultaneously, huge amount of data and experience has been collected, for example, allowing to predict the strain and wear of corresponding components. Also, it is to be expected that even more complex designs will be introduced into the market in the near future resulting in the desire to simulate the behavior with a significantly improved precision and monitor the wear of such component more closely. Especially, it will be a challenge to monitor the behavior and provide reliable assessments with regard to the reliability and lifetime despite the significantly lower number of usable data available. According to further embodiments it is preferred that the inventive method is utilized for components of continuous flow engines like compressors, gas turbines and steam turbines, more preferred gas turbines and steam turbines, even more preferred gas turbines. It was noted that the inventive method is especially beneficially applied to components to be exchanged during maintenance of such devices.

According to one aspect the present invention refers to a method as described above.

Acquiring information with a high degree of precision utilizing destructive analyzing methods is readily available. However, it was noted that data with enough details can also be obtained by non destructive testing methods. According to further embodiments it is preferred that the determination of the multiple types of oxidation layers and their properties is performed utilizing a non destructive measurement method. Such non destructive measurement method does not damage or destroy the component. This allows to utilize the inventive method also during maintenance as fast and easy check to acquire information with regard to the wear state of the component. Especially for expensive components like vanes and blades such method of measuring is especially beneficial. Preferably, such measurement method utilizes a physical method of analysis. For example, a type of measurement being especially useful utilizes eddy current measurement.

Naturally, it is preferred that as many informations are acquired as possible. However, it was noted that enough information can also be acquired during a single step making the inventive method especially useful for maintenance actions including such method as additional step to further improve the service and provide additional possibilities to optimize the maintenance process. According to further embodiments it is preferred that the determination of the multiple types of oxidation layers and their properties is performed utilizing a single measurement method, preferably using a single measurement. In this context, it was also noted that it is possible to significantly reduce the amount of measurements required to provide a sufficient quality of the data for cases like hot gas path components of continuous flow engines. Based on the defined strain resulting from the utilization of the continuous flow engine it is possible to significantly cut down the required number of the measurements and also the measurement time. For example, it is typically sufficient to measure the corresponding oxidation layer stack on the upstream side of vanes and blades. Herein, such measurement should be located in the middle area of the component in a view along the flow direction of the flow medium of the continuous flow engine. Here, a very reliable and meaningful measurement can be taken allowing to acquire detailed and reliable information with regard to the wear state of the component.

Furthermore, it is possible to even further improve the information acquired from the data of the oxidation layer stack by including the three dimensional (3D) form of the component at the location of the measurement. According to further embodiments it is preferred that the method contains determining the 3D form of the component at the location of the oxidation layers. The improvement of the quality of that analyzes resulting from the data was surprisingly big. To acquire best results it is required that the component benefiting significantly from such extended analysis has to be subject to very consistent conditions. In this context, it has been shown that conditions as available for hot gas path components of continuous flow engines are very suitable and make best use of such extended method. Taking into account the specific form and, for example, the flow of the flow medium trough such continuous flow engine allows to calculate the properties of a corresponding component providing the detected oxidation layers and simulate the oxidation state to be expected far more detailed. Allowing to guarantee even better estimations and further decrease required safety margins of planned maintenance schedules. Herein, the three-dimensional form can be acquired on site from the specific component or from corresponding data like CAD data and assigning the corresponding oxidation layer data to the specific location the measurement was taken. It is also possible to instruct the corresponding field personal to take the measurement at a specific location to obtain the data with regard to the multiple oxidation layers at a part of the component providing a defined geometry.

In general, it was noted that the generic benefit can be improved by automatically collecting further data related to the measurement. According to further embodiments it is preferred that a further type of measurement like a visual measurement is taken directly before, during or directly after the measurement of the oxidation layers. For example, the maintenance tool utilized to realize the inventive method can provide a camera taking a picture to document where the measurement of the oxidation layer was taken or how to surface the oxidation layers have been determined look like. Surprisingly, such simple additional information acquired during the measurement allows to automatically assign the data of the oxidation layers acquired to the 3D form of the component allowing a further improvement of the measurement with little effort.

Very surprising was that even from very thin oxidation layers significant information can be acquired. According to further embodiments it is preferred that the multiple oxidation layers are located in a distance of at most 2 mm, more preferred at most 0.12 mm, even more preferred at most 0.7 mm, from the surface of the component. For application cases like a hot gas path of the continuous flow engine can be preferred that the measurement is limited to a depth of most 0.5 mm, even more preferred 0.4 mm. Herein, the major part of the oxidation layers is typically far bigger, however, it was noted that it is typically beneficial to include some deeper measurement into the unaffected material. The oxidation layers measured that way are not affecting the utilization of such component. However, it was noted that the information can be used to very reliably detect the prior utilization as well as collect data with the regard to reliability simulations and lifetime predictions.

As already indicated above it was noted that for many reasons it is surprisingly beneficial to apply the inventive method for components utilized in continuous flow engines. According to further embodiments it is preferred that the component is a component of a continuous flow engine like a turbine vane, turbine blade, compressor vane, compressor blade, heatshield or burner. Typically, it is preferred that the component is a hot gas path component of a continuous flow engine like a steam turbine or a gas turbine. For example, the combination of nondestructively acquiring data very swiftly to allow your relationship like the ones regarding the lifetime are highly beneficial for such application cases significantly beyond other applications providing no such requirements under such conditions.

Also, it was noted that the inventive method can be especially usefully applied to components made of metal or metal alloy. According to further embodiments it is preferred that the part of the component is consisting of a metal or metal alloy like titanium and/or a heat resisting metal alloy like a nickel superalloy. Surprisingly, also partial oxidations depleting certain metals of a metal alloy first were able to be identified allowing to especially usefully applying the inventive method to metal alloys like nickel superalloys.

Furthermore, it was noted that information with regard to the thickness of multiple oxidation layers can be beneficially utilized. According to further embodiments it is preferred that at least two oxidation layers are analyzed with regard to their thickness, wherein a ratio of the thickness of the at least two oxidation layers is determined, and wherein the ratio is compared to a comparison value to judge the wear state of the component. It was noted that such information can be beneficially utilized to, for example, acquire more detailed information with regards to the prior utilization of the component. It appears that different kinds of utilization result in different oxidation layers structures including especially the relative thickness of the oxidation layers to each other.

The data acquired can furthermore be compared to available data. According to further embodiments it is preferred that the wear state is compared to and/or stored in a digital model of the component. Such system is especially useful in case a fast and reliable connection to an available database containing corresponding data is available. Herein, the time and effort required for corresponding simulations and calculations can be at least significantly reduced by identifying comparable data in the database to, for example, review the prior usage in such comparable case and/or review the subsequent development of such comparable component.

Surprisingly, the data acquired can furthermore be utilized for lifetime prediction. According to further embodiments it is preferred that the lifetime of the component is determined based on the data with regard to the oxidation layers and a wear model. For example, such wear model takes into account an incremental layer growth according to formula (I):

$$x(t+dt)-x(t)=(t+dt)*K_0*eT(x(t))-x(t) \tag{I}$$

It is very surprising that despite the low influence of such oxidation layer being typically not relevant for the real lifetime such prediction can be made. Typically, properties like the overall mechanical integrity influenced by, for example, internal recrystallization processes taking place in such component and the like determine the real lifetime of the component. Yet it is possible to acquire highly reliable lifetime predictions by such indirectly influenced oxidation layers that surprisingly allows to deduct the current state and further development to be expected.

This information acquired can furthermore be utilized to adapt the maintenance system. According to further embodiments it is preferred that the wear state is utilized to calculate a maintenance fees for a device containing the component. Surprisingly, it is possible to significantly improve the lifetime prediction and wear prediction and, thus, the present invention allows to adapt the maintenance fee accordingly. This provides significant technical benefits, as it becomes possible to reduce the number of component replacements and increase the runtime of the corresponding devices containing such component without reducing the reliability.

Furthermore, it is possible to adapt the maintenance plan utilizing the inventive method. According to further embodiments it is preferred that the data regarding the multiple types of oxidation layers is utilized to assess a maintenance schedule and adapt the maintenance plan. It was noted that the data that can be acquired herewith allows to very precisely assess the current state component and review whether the real wear state is comparable to the one utilized for setting up the maintenance plan. Based on the result the maintenance plan can be adapted to reflect the real wear of the component and the overall maintenance requirements expected from this. Herein, it was surprisingly noted that based on historic data reference component can be identified that indicate the overall wear of the device containing said component. This typically works especially well for devices providing very continuous strain of the component even when said strain changes over time. Example of such embodiment is a continuous flow engine like a gas turbine.

Additionally, the mechanical properties of the component can at least partially be determined utilizing the inventive method. According to further embodiments it is preferred that the data regarding the multiple types of oxidation layers is utilized to determine a mechanical property of the component. For example, such mechanical property as the mechanical stability representing, for example, how much force can be applied without risking that the component provides cracks or even breaks apart. This is very surprising, as such mechanical properties are depending on many other characteristics, wherein such oxidation layer on the surface of the component only plays a very minor part. However, it was noted that taking into account historic data, models and simulations it becomes possible to utilize data regarding such oxidation layers to gain surprisingly reliable data being otherwise only available by extensive tests and measurements typically including destructive measurements. Such destructive measurements would at least require a repair step of the component to provide a usable component again.

Two types of oxidation layers that are typically beneficially reviewed are as follows. According to further embodiments it is preferred that the multiple types of oxidation layers contain a layer representing fully oxidized material and a layer representing material partially penetrated by oxide. Typically, it is preferred that the multiple oxidation layers furthermore contain a layer of depleted material. Additionally, it is typically preferred to locate the border to unoxidized material. While it is not necessarily required to determine the thickness of this layer and it might be indirectly be acquirable be utilizing the position and thickness of the layer located above it is surprisingly beneficial to also acquire this information for comparative and assurance reasons. Especially for high temperature resistant materials like nickel superalloys it was noted that different kind of layers can easily be identified. It is assumed that this is also based on the microstructure of corresponding materials including the grain structure typically observed. It appears that the borders of the grain structure represent an obstacle in the context of the oxidation process resulting in such grain structures being resistant against oxidation for longer duration. Based on the kinetics in the context of the oxygen diffusion into the material and metal ion diffusion in direction of the surface being influenced by such grain structure the position and thickness of an oxidation layer containing such grain structure surprisingly allows to even more detailed deduct the past utilization of said component. It seems that the defined conditions within continuous flow engines allows to gain significant insight in, for example, the prior use. During normal use the oxidation is slow enough such that the kinetic limitation of corresponding grain structure elements might only slow down the overall oxidation in a low or irrelevant amount. However, in case the conditions are very straining the oxidation progresses very fast indicating an increased overall chance of creating cracks and comparable failures. Therefore, determining what type of oxidation layer is available in what amount allows to deduct past uses of the component as well as determining future properties the component and evaluating its future reliability.

Additionally, it was noted that inhomogeneous oxidation processes can be observed resulting in the enrichment of specific metal oxides like aluminum oxide, chromium oxide, tantalum oxide, and/or further oxides of the metals contained in the metal alloy of the component material. Herein, the growth of corresponding oxide layers providing specifically enriched metal oxides or metal oxide mixtures or even consisting only of such surprisingly allows to gain significant insight into the past utilization of the component as well as how the component will develop in the future.

According to a further aspect the present invention refers to a computer program product, tangibly embodied in a machine-readable storage medium, including instructions operable to cause a computing entity to execute an inventive method.

The term "computer" refers to any electronic device comprising a processor, such as a general-purpose central processing unit (CPU), a specific purpose processor or a microcontroller. The processor is adapted to execute a special computing task, namely for providing the load skewness result. A computer is capable of receiving data (an input), of performing a sequence of predetermined operations thereupon, and of producing thereby a result in the form of data or signals (an output). Depending on context, the term "computer" will mean either a processor in particular or can refer more generally to a processor in association with an assemblage of interrelated elements contained within a single case or housing.

The computer program product may be processed in a distributed manner, such as that certain steps are performed on a first computing entity (e.g. at the turbine) and that other steps are performed on a second computing entity (e.g. on a central server).

The computer program product may be offered, placed on market, used, imported and/or stored as (and thus may be part of) a computer program product. Thus, the computer program product may be provided on a storage medium (computer readable medium, like a computer disc or a memory stick etc.). Alternatively, the computer program product may be provided via download by means of a respective network connection to a server, which stores the computer program product by providing a link to the server with the computer program product stored thereon. A "computer-readable medium" or "storage medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The computer program product according to further embodiments is adapted to execute the embodiments of the inventive method and the embodiments of the inventive system. The same naturally, applies to the other aspects as described herein. In this context, it has to be understood that each single or a combination of the specific embodiments as described above can be utilized to modify the computer program product as specified.

The computer program product can furthermore contain a learning mechanism to optimize the results. According to further embodiments it is preferred that the computer program product utilizes machine learning to optimize processing the data regarding the oxidation layers. For example, it reviews the corresponding evaluations of comparable cases and their results including measured results at later point of time to verify the applicability of the current models and systems of simulation. Herein, also some reinforced machine learning mechanism can be utilized. It was noted that this price the possibility to automatically even further improve the results obtained utilizing the inventive computer program product.

Herein, it was noted that such machine learning process can also be initiated for historic data lacking the corresponding pattern with regard to the oxidation layers. Surprisingly, it was noted that further adaptions to a specific application case can be acquired by simulating the oxidation layer development over the lifetime of comparable components and comparing the end result being measured and stored in some database to the one simulated. This provides the possibility to significantly improve the predictions by optimizing the calculations and simulations based on such historic data readily available and allowing to specifically adapt, for example, the inventive method and computer program product even for new application cases.

According to further aspect the present invention refers to a storage device for providing an inventive computer program product, wherein the device stores the computer program product and/or provides the computer program product for further use. Examples of such storage device can be databases like distributed databases or data storages like hard drives or USB sticks.

According to a further aspect the present invention refers to a system comprising a processor and a non-transitory computer readable medium comprising computer executable instructions that when executed by the processor cause the system to perform operations comprising:—evaluating the data regarding the multiple oxidation layers, wherein the oxidation layers originate from the same material of the component,—diagnosing the wear state of the component by utilizing the properties of the oxidation layers.

It was noted that it is typically beneficial that the system has the possibility to access historic data. According to further embodiments it is preferred that the system contains a database, preferably a distributed database, containing historic data regarding at least one comparable component and at least one wear state of the at least one comparable component, wherein the historic data is utilized to evaluate the wear state of the component based on the data of the multiple oxidation layers. This is, for example, especially beneficial for application cases like continuous flow engines. In such application cases a lot of data is collected over time for the same or comparable continuous flow engines allowing to rely on our very extensive database. Surprisingly, it was noted that such historic data can be beneficially utilized to gain insight into the current state as well as significantly reduce the effort required for predicting the future of the corresponding component. Very surprisingly, it was noted that even historic data with no information with regard to the oxidation layers itself can be beneficially utilized. Herein, the current experiences can be utilized to provide models and simulations to retrospectively provide this data for the historic cases. Furthermore, it is possible to take measurements at present time and simulate the past states allowing to update historic data by corresponding information regarding the oxidation layers. While this additional step seems little helpful and only providing additional work it was noted that this is surprisingly beneficial as it allows to provide a historic database with such information. Subsequently, this simulated data is available to be compared to new measurements, wherein the reliability of the corresponding simulations is very good.

According to further aspect the present invention refers to maintenance tool for measuring the oxidation layers for an inventive method, wherein the maintenance tool collects data with regard to the multiple oxidation layers, wherein the data contain the position and thickness of the multiple oxidation layers and/or can be utilized to determine the position and thickness of the multiple oxidation layers. It was surprisingly noted that such tool was not utilized for maintenance work before. Using a tool fulfilling the requirements for such purpose is surprisingly beneficial for the maintenance work and allows to significantly increase the service provided in this context. Herein, the specific requirements of the continuous flow engines like the data available, the harsh conditions the components are confronted with, the required high reliability and so on result in such maintenance tool being a possibility to very significant improve the service provided to a costumer.

For many applications cases it is beneficial that an inventive system is integrated. According to further embodiments it is preferred that the maintenance tool contains an inventive system. This allows, for example, the maintenance specialist to work independently and flexibly provide the benefits of the inventive method on site without any required communication to a central service location or database. Surprisingly, this is considered to be very beneficial by corresponding field personal being questioned. For example, it allows to not rely on the customers internet connection or the mobile connection of the field personal being typically problematic.

Typically, it is preferred that the maintenance tool also provides at possibility to store data. According to further embodiments it is preferred that the maintenance tool is adapted to temporarily and/or permanently, preferably temporarily, store historic data with regard to comparable components. This allows to, for example, to provide an instant assessment with regard to the wear state of the component. Herein, such instant assessment can, for example, contain the first feedback whether the current wear state is as expected or whether there is a significant deviation from the expected wear state. For example, such expected wear state can be based on some digital model the component reflecting the properties of the component and its change of the component during the usage.

According to further aspect the present invention refers to a use of an inventive method or an inventive maintenance tool during the maintenance of a continuous flow engine. Surprisingly, it was noted that utilizing the inventive maintenance tool provides highly beneficial information enabling to significantly improve the maintenance work of such engines. Especially, the possibility to acquire data to be used for evaluating the wear state of the continuous flow engine proved to be highly beneficial. Furthermore, it was surprisingly noted that the information acquired can be utilized in corresponding models to evaluate the future wear of the continuous flow engine and improve the service and maintenance planning of such engine with a significantly improved precision and reliability.

Furthermore, it was noted that for hot gas path components specific characteristics are especially beneficially determined. According to further embodiments it is preferred that the wear state and/or lifetime, more preferred lifetime, of a hot gas path component is determined. Such characteristics are not only able to be determined with a surprisingly high precision. Additionally, the possibility to easily determine these characteristics in short time is especially useful for application cases of continuous flow engines. Especially the benefit obtained based on the possibility to swiftly and accurately determining corresponding characteristics during maintenance is the significant benefit very valuable for a customer as well as a company providing maintenance service.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

Figure 1:
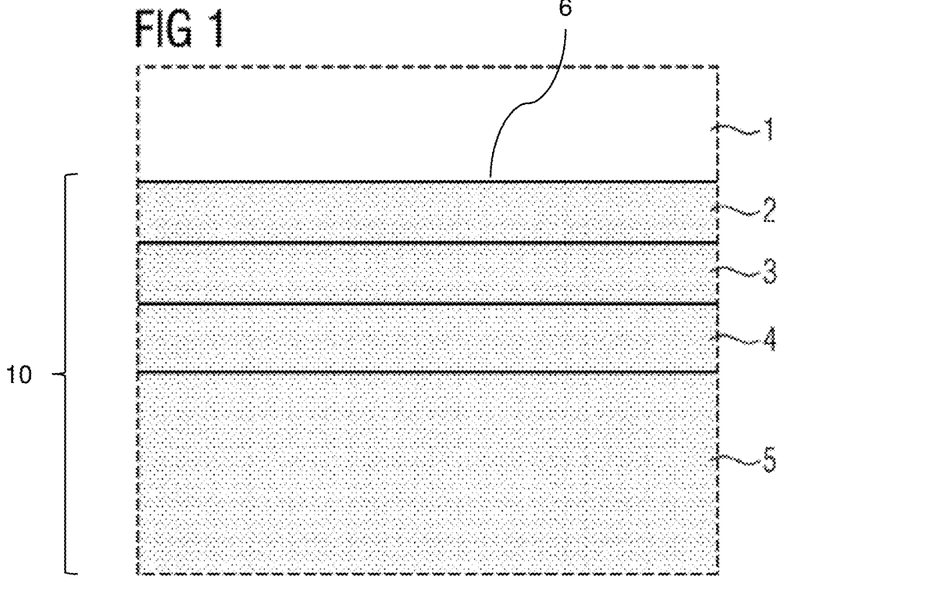
FIG. 1 shows a cutout of a schematic cross section of a scheme component providing a stack of multiple oxidation layers, wherein the cross section is perpendicular to the surface of said component.
Figure 3:
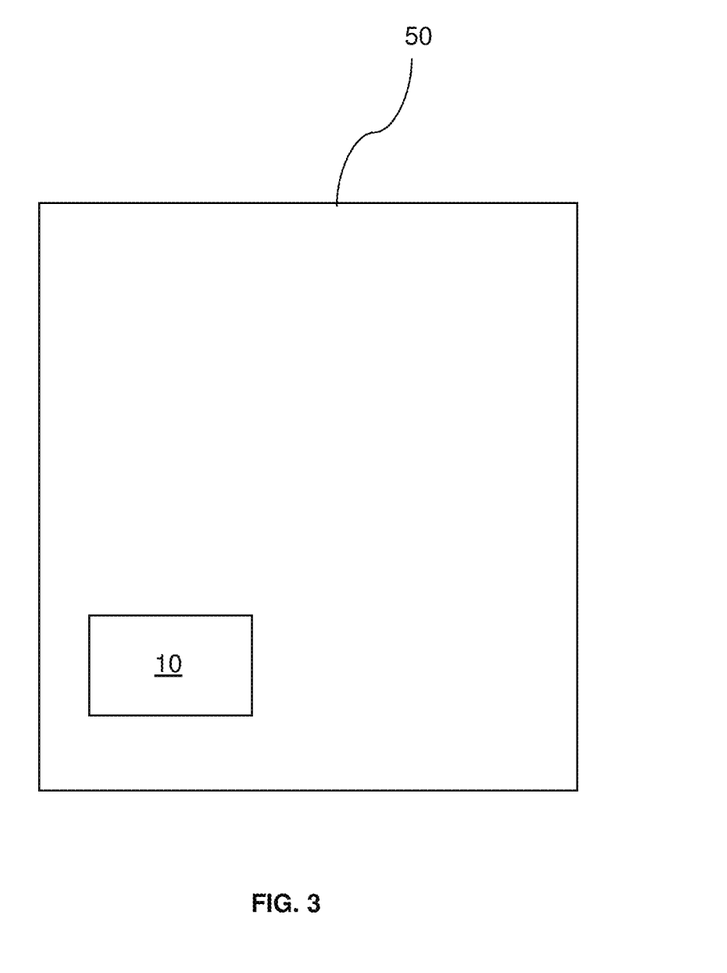
FIG. 3 shows a continuous flow engine including the component of FIG. 1.

FIG. 1 shows a cutout of a scheme of a component 10 providing a stack of multiple oxidation layers located at the surface 6 of said component 10. As shown in FIG. 3, the component 10 is a component of a continuous flow engine 50. For example, the component 10 is a turbine blade utilized in the hot gas path of a continuous flow engine and consists of a nickel superalloy. During its utilization the outer area 1 is the hot gas path surrounding the turbine blade. The surface 6 is part of an oxidation layer 2 extending from the surface 6 into the component 10. Below this oxidation layer 2 the oxidation layers 3 and oxidation layer 4 are located. The three oxidation layers 2, 3, 4 represent a stack of oxidation layers extending from the surface 6 of the component 10 to the unoxidized material 5 of the component 10.

Oxidation layer 2 consists of fully oxidized material and provides a thickness of around 0.017 mm. Oxidation layer 3 contains fully oxidized material, but also includes grains of unoxidized material. The thickness of oxidation layer 3 is around 0.016 mm. The grains are not shown in FIG. 1. Oxidation layer 4 contains partially oxidized material also containing grains of unoxidized material 5. The partial oxidation of oxidation layer 4 results in a specific enrichment of certain metal oxides in the oxidation layer 4. The thickness of the oxidation layer 4 is around 0.015 mm. Said layer is continuously depleted from certain metals being first to be oxidized during such oxidation process before the border of oxidation layer 3 moves downwards extending the area of fully oxidized material. The border of oxidation layer 4 on the other hand also moves downwards into the unoxidized material 5 increasing the thickness of the layer stack of the oxidation layers 2, 3, 4.

The grains contained in oxidation layer 3 and oxidation layer 4 originate from the grain microstructure of the unoxidized material. Based on kinetic reasons said grains are still available in the oxidation layer 3 and oxidation layer 4 while the material surrounding said grains is already completely oxidized. The relatively big thickness of oxidation layer 3 and oxidation layer 4 as well as the presence of grains of unoxidized material indicates that the oxidation process was quite fast. During the utilization of the component the progress of the oxidation was too fast to allow these grains to oxidize along with the surrounding material.

Not shown in FIG. 1 is an intermediate oxidation layer located between the oxidation layer 4 and the unoxidized material layer 5. Within this layer a mixture of beginning depletion as well as areas of unoxidized material is available.

The data with regard to the oxidation layers 2, 3, 4 can be acquired by providing samples by means of cutting component apart. However, in the case as shown in FIG. 1 the determination of the properties of the oxidation layer 2, 3, 4 is realized utilizing eddy current measurements. It was noted that, for example, taking into account the specific composition of the material of the component the progress of the corresponding oxidation process can be simulated for different kinds of oxidations. Surprisingly, the corresponding results allow to evaluate measurements utilizing, for example, eddy current testing to identify the current wear state by simulating the results to be expected and deducting the real layer structure available for the component. This allows to nondestructively measure the component and keep it operable. This allows to include this analysis as additional standard step during maintenance to continuously monitor the life of the component and detect relevant deviations significantly increasing the possible service provided.

Herein, the inventive method utilizing, for example, eddy current testing allows to acquire the required data with a single measurement. This is also very beneficial, as it significantly increases the speed of the corresponding test making it easy to implement during maintenance. Focusing on the oxidation layer stack and utilizing it as indicator for the overall wear state of the component is surprisingly reliable and allows to improve the service for the corresponding maintenance on continuous flow engines like such gas turbine significantly.

Taking into account the fast progression of the oxidation layer resulting in thick layers of the different types as well as the inclusion of the grains of unoxidized material indicate a highly strained use. The overall wear state of the component is beyond of what is to be expected and should be resulting from unplanned kind of use including rapid changes of temperature including temperatures slightly outside the normal operating conditions. The ratio of oxidation layer 3 and oxidation layer 4 further verify this development and that oxidation layer 3 provides a comparable thickness to oxidation layer 4 indicates that said usage already started some time ago and was maintained for a certain period of time.

Taking the above into account the lifetime model of the component is to be adapted to include this unexpected use being more excessive than originally considered. Taking into account a historic database such updated lifetime and progression of the wear state is calculated and utilized to adapt the maintenance schedule. The technically optimized maintenance plan again is utilized to adept the maintenance fees to reflect the increased wear of the device. This allows to provide an improved service planning allowing to also a more flexible utilization of the device containing the component. Also, for example, in case the strain on such device should be increased for an extended period of time it becomes possible to utilize corresponding data collected during the last maintenance to check whether such usage is possible or might lead to problems.

Herein, this method can be realized using a computer program product installed, for example, on a maintenance tool utilized for a corresponding measurement during maintenance or in a distributed database such maintenance tool is connected to. In case the corresponding hardware and software is provided as maintenance tool it allows to directly evaluate the state of the component on site and immediately take the required action during the same maintenance of the continuous flow engine.

Figure 2:
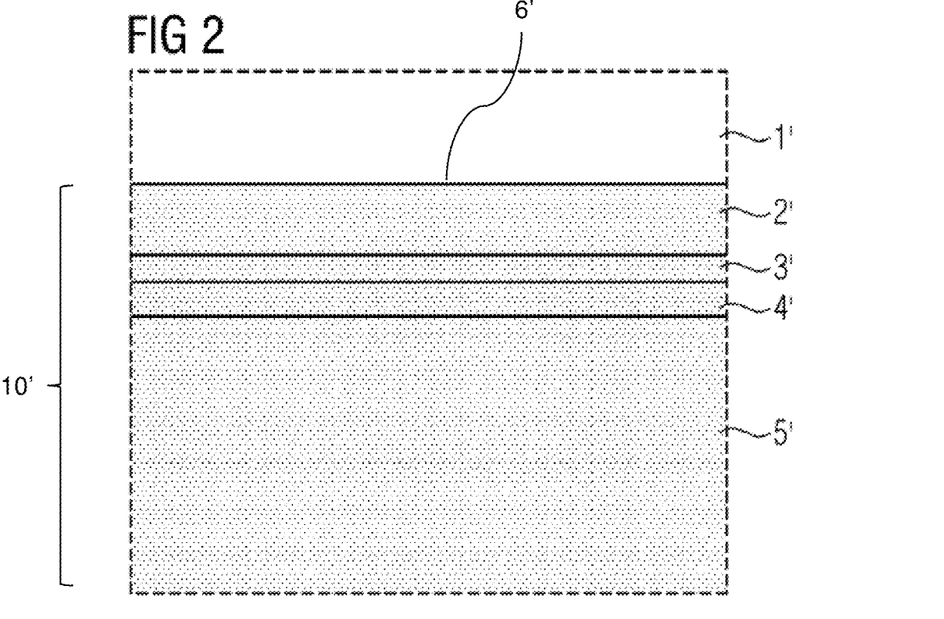
FIG. 2 shows a cutout of a schematic cross section of a scheme component providing a different stack of multiple oxidation layers, wherein the cross section is perpendicular to the surface of said component.

FIG. 2 shows a cutout of a schematic cross section of a scheme component providing a different stack of multiple oxidation layers, wherein the cross section is perpendicular to the surface 6' of said component 10'. Comparable to the embodiment of FIG. 1 the component 10' is a turbine blade of a gas turbine consisting of the same material. However, the condition of usage were significantly different. The outer area 1' represents the hot gas path surrounding the turbine blade during its utilization. The surface 6' is part of an oxidation layer 2' extending from the surface 6' into the component 10'. Below this oxidation layer 2' the oxidation layers 3' and oxidation layer 4' are located. The three oxidation layers 2', 3', 4' represent a stack of oxidation layers extending from the surface 6' of the component 10' to the unoxidized material 5' of the component 10'.

Oxidation layer 2' consists of fully oxidized material and provides a thickness of around 0.017 mm. Oxidation layer 3' contains partially oxidized material and provides a thickness of around 0.007 mm. Said layer is continuously depleted from certain metals being first to be oxidized during such oxidation process before the border of oxidation layer 2' moves downwards extending the area of fully oxidized material. Oxidation layer 4' contains a mixture of beginning depletion as well as areas of unoxidized material. The oxidation layer 4' provides a thickness of around 0.009 mm and represents a starting oxidation of the unoxidized material layer 5' inhomogeneously growing into the material of the component.

Contrary to the example as shown in FIG. 1 the oxidation layer contains no grain of unoxidized material. This originates from a slower oxidation allowing the oxidation to grow slower into the material including grains contained in the microstructure. On the other hand the oxidation layer stack provides a oxidation layer 4' of significant thickness. Herein, local weaknesses like cracks in the oxidation layers above result in a localized growth of the oxidized material into the unoxidized material layer 5'. Based on the overall slow growth of the oxidation layers such weaknesses resulting by chance during use of the component represent a significant source of localized oxidation. On the contrary the rapid growth of the oxidation layers resulting from the harsh conditions applied to the component shown in FIG. 1 leads to a low relevance of such processes based on different processes being dominating.

The measurement of the oxidation layers was performed using the same maintenance tool as utilized in the example of figure one. Contrary to FIG. 1 the results obtained allow to increase the intervals between maintenance actions and lower the maintenance fees. Furthermore, based on the overall state of the component and the indirectly determined low wear of it allows a more flexible usage of the gas turbine. Even extreme conditions are possible during times of emergency as the wear state of the component indicates a high reliability and mechanical stability still provided guaranteeing the safety even during such use.

The scope of protection of the present invention is specified by the appended claims and is not restricted by the features explained in the description or shown in the drawing.

The invention claimed is:

1. A method of diagnosing a wear state of a component of a continuous flow engine, comprising:
    determining multiple types of oxidation layers and their properties, wherein the multiple types of oxidation layers originate from the same material of the component,
    diagnosing the wear state of the component by utilizing the properties of the multiple types of oxidation layers.

2. The method according to claim 1,
    wherein the determination of the multiple types of oxidation layers and their properties is performed utilizing a nondestructive measurement method.

3. The method according of claim 1,
    wherein the determination of the multiple types of oxidation layers and their properties is performed utilizing a single measurement method.

4. The method according to claim 1,
    wherein the multiple oxidation layers are located in a distance of at most 2 mm from a surface of the component.

5. The method according to claim 1,
    wherein the component is a component of a continuous flow engine.

6. The method according to claim 5,
    wherein the component is a turbine vane, a turbine blade, a compressor vane, a compressor blade, a heatshield or a burner.

7. The method according to claim 1,
    wherein a part of the component consists of a metal or metal alloy and/or a heat resisting metal alloy.

8. The method according to claim 7,
    wherein the part of the component consists of titanium.

9. The method according to claim 1, further comprising:
    analyzing at least two oxidation layers with regard to their thickness,
    determining a ratio of the thickness of the at least two oxidation layers, and
    comparing the ratio to a comparison value to judge the wear state of the component.

10. The method according to claim 1,
    wherein a lifetime of the component is determined based on data with regard to the oxidation layers and a wear model.

11. The method according to claim 1,
    wherein the wear state is utilized to calculate maintenance fees for a device containing the component.

12. The method according to claim 1,
    wherein data regarding the multiple types of oxidation layers is utilized to assess a maintenance schedule and adapt a maintenance plan.

13. The method according to claim 1,
    wherein data regarding the multiple types of oxidation layers is utilized to determine a mechanical property of the component.

14. A computer program product, tangibly embodied in a non-transitory machine-readable storage medium, comprising:
    instructions stored thereon operable to cause a computing entity to execute a method according to claim 1.

15. A maintenance tool for measuring the oxidation layers for a method according to claim 1,
    wherein the maintenance tool collects data with regard to the multiple oxidation layers,
    wherein the data contain a position and a thickness of the multiple oxidation layers and/or is utilized to determine the position and the thickness of the multiple oxidation layers.

16. A method for maintaining a continuous flow engine, comprising:
    diagnosing the wear state of the component of the continuous flow engine according to the method of claim 1.

17. The method according to claim 1,
    storing, in a database, historic data with regard to comparable components to the component of the continuous flow machine, said historic data comprising the properties of the multiple types of oxidation layers in the comparable component and a wear state of the comparable component; and
    wherein the diagnosing step comprises comparing the properties of the multiple types of oxidation layers with the historic data to diagnose the wear state of the component.

18. The method according to claim 1, further comprising:
    providing an assessment of the wear state of the component including determining a deviation between a current wear state of the component of the continuous flow machine with an expected wear state of the component of the continuous flow machine;

wherein the expected wear state of the component is based on a digital model of the component reflecting the properties of the multiple types of oxidation layers and a change in the properties of the multiple types of oxidation layers during usage of the component.

19. The method according to claim 1, wherein the multiple types of oxidation layers that originate from the same material of the component comprises two or more of:
- a first layer including fully oxidized material of the component;
- a second layer including fully oxidized material of the component and grains of unoxidized material of the component; and
- a third layer including partially oxidized material of the component;
- wherein the second layer extends from a surface of the component by a greater extent than the first layer; and
- wherein the third layer extends from the surface of the component by a greater extent than the second layer.

20. A system comprising:
- a processor, and
- a non-transitory computer readable medium comprising computer executable instructions stored thereon that when executed by the processor cause the system to perform operations comprising:
- evaluating data regarding multiple oxidation layers, wherein the multiple oxidation layers originate from the same material of a component,
- diagnosing a wear state of the component by utilizing the data regarding the properties of the multiple oxidation layers.

\* \* \* \* \*